United States Patent [19]
Manchak, III et al.

[11] Patent Number: 5,242,246
[45] Date of Patent: Sep. 7, 1993

[54] SURFACE REMEDIATOR

[75] Inventors: Frank E. Manchak, III; Peter J. Manchak, both of Santa Barbara, Calif.

[73] Assignee: Terranalysis Corporation, Santa Barbara, Calif.

[21] Appl. No.: 838,576

[22] Filed: Feb. 18, 1992

[51] Int. Cl.⁵ .................. F23G 5/00; E02F 3/08; E01H 15/00
[52] U.S. Cl. .................. 405/128; 405/258; 405/303; 588/228; 37/359; 37/142.5; 37/464; 37/904; 37/906; 110/346
[58] Field of Search ............... 405/128, 129, 258, 267, 405/303; 588/252, 257; 37/89, 90, 142.5, 189, 190, 192 A, 192 R, DIG. 18, DIG. 19; 432/13, 14; 110/346

[56] References Cited

U.S. PATENT DOCUMENTS

| | | | |
|---|---|---|---|
| 1,283,383 | 10/1918 | Webster | 37/192 R |
| 3,603,097 | 9/1971 | Zakiewicz | 37/86 |
| 4,028,902 | 6/1977 | Gourson et al. | 405/179 X |
| 4,648,332 | 3/1987 | Goedhart | 110/346 X |
| 4,681,483 | 7/1987 | Camilleri | 405/258 X |
| 4,738,206 | 4/1988 | Noland | 110/346 |
| 4,843,742 | 7/1989 | Camelleri | 37/90 |
| 4,844,839 | 7/1989 | Mandrak | 405/128 X |
| 4,913,586 | 4/1990 | Gabbitta | 405/129 |
| 4,927,293 | 5/1990 | Campbell | 405/303 X |
| 5,020,452 | 6/1991 | Rybak | 110/346 X |
| 5,052,858 | 10/1991 | Crosby et al. | 405/128 |
| 5,088,856 | 2/1992 | Yocum | 405/128 |
| 5,118,230 | 6/1992 | Justice | 405/267 X |

FOREIGN PATENT DOCUMENTS

| | | | |
|---|---|---|---|
| 3209134 | 9/1983 | Fed. Rep. of Germany | 37/1 |
| 232325 | 1/1986 | Fed. Rep. of Germany | 37/1 |

Primary Examiner—David H. Corbin
Assistant Examiner—Arlen L. Olsen
Attorney, Agent, or Firm—Roth & Goldman

[57] ABSTRACT

A soil surface remediation apparatus useful for decontamination of oil or chemical spill sites and toxic waste containing sites comprises a soil treatment apparatus mounted on a mobile trenching machine tractor which excavates trenches in a contaminated site to remove contaminated soil to the surface apparatus where the soil is decontaminated and is immediately replaced into the excavated trench in a continuous operation. Hydrocarbons or other useful by-products such as precious metals may be recovered from the soil. Both deep trenching and shallow trenching embodiments are disclosed.

17 Claims, 5 Drawing Sheets

SURFACE REMEDIATOR

BACKGROUND OF THE INVENTION AND PRIOR ART

The present invention relates to the treatment of toxic waste contaminated sites or spill sites which may contain chemical and/or radioactive compositions that pollute the environment and threaten public health and safety. The sites may contain one or more of various chemical and radioactive compositions, hydrocarbons, e.g., oil spills, and metals. The contaminants present in such sites are wide ranging in both type and concentration levels. They vary from a wide range of organic, chlorinated and inorganic compounds and precious metals and in some cases such compounds may be mixed with radioactive materials ranging from low to intermediate radioactivity levels.

Conventional methods of remediating such waste disposal sites include:

1. Excavation and transportation of contaminated soils to other landfills;
2. Excavation and transportation of contaminated soils to a central offsite treatment plant;
3. Physical containment of the waste site with an impermeable wall which prevents migration of contaminants into the groundwater;
4. In situ treatment of the contaminants by stripping volatile organic compounds therefrom without excavation; and
5. In situ addition of treatment reagents without excavation.

Each of the above methods includes various drawbacks which primarily render them cost ineffective, dangerous to treatment personnel and generally ineffective treatment.

Operations which involve physical transportation of contaminated materials to a different treatment or landfill site clearly involve extra hazards of spill accidents during transport and the natural reluctance of residents in proximity to a landfill to accept additional materials which have been removed from other landfills or contaminated sites.

Those treatment methods which involve physical containment of a waste site with a contaminant barrier wall result in a "bathtub effect" which often creates undesired downward migration or spillover of the contaminants through cracks or porosity of the containment wall. These undesired conditions often are aggravated by chemical reactions with the contained compositions.

In situ vapor extraction methods which involve the placement of standpipes into the contaminated subsurface for removal of volatiles inherently result in nonuniform treatment with the greatest effectiveness being only within a relatively short distance from the standpipes.

Other methods which involve pumping and treatment of contaminated groundwater from an aquifer suffer from the problems of mass capital investment, high energy consumption and general inefficiency in treating the source of the problem, namely the contaminated soil.

It is therefore the primary object of the present invention to provide a cost effective and efficient apparatus for treatment of a hazardous waste site, whether it be a small gas station or a large multi-acre site.

In general, the solution to the problem involves a mobile apparatus comprising a trenching machine which is capable of operating to subsurface depths as low as 40 feet below the ground elevation and which effectively excavates, treats, and immediately recirculates treated soil back into the excavated trench in a rapid and continuous fashion.

Accordingly, the present invention provides a surface soil remediation apparatus comprising a mobile trenching machine, said trenching machine having a digging boom and moveable soil elevators for removing soil from a trench; a process conveyor on said apparatus for receiving excavated soil and for treating toxic contaminants in said soil; means on said apparatus for intimately mixing treatment reagents with said excavated soil in said process conveyor; and said process conveyor having a discharge end arranged for extruding treated soil from said process conveyor to refill said trench closely behind said digging boom.

DESCRIPTION OF THE PREFERRED EMBODIMENT

Figure 1:
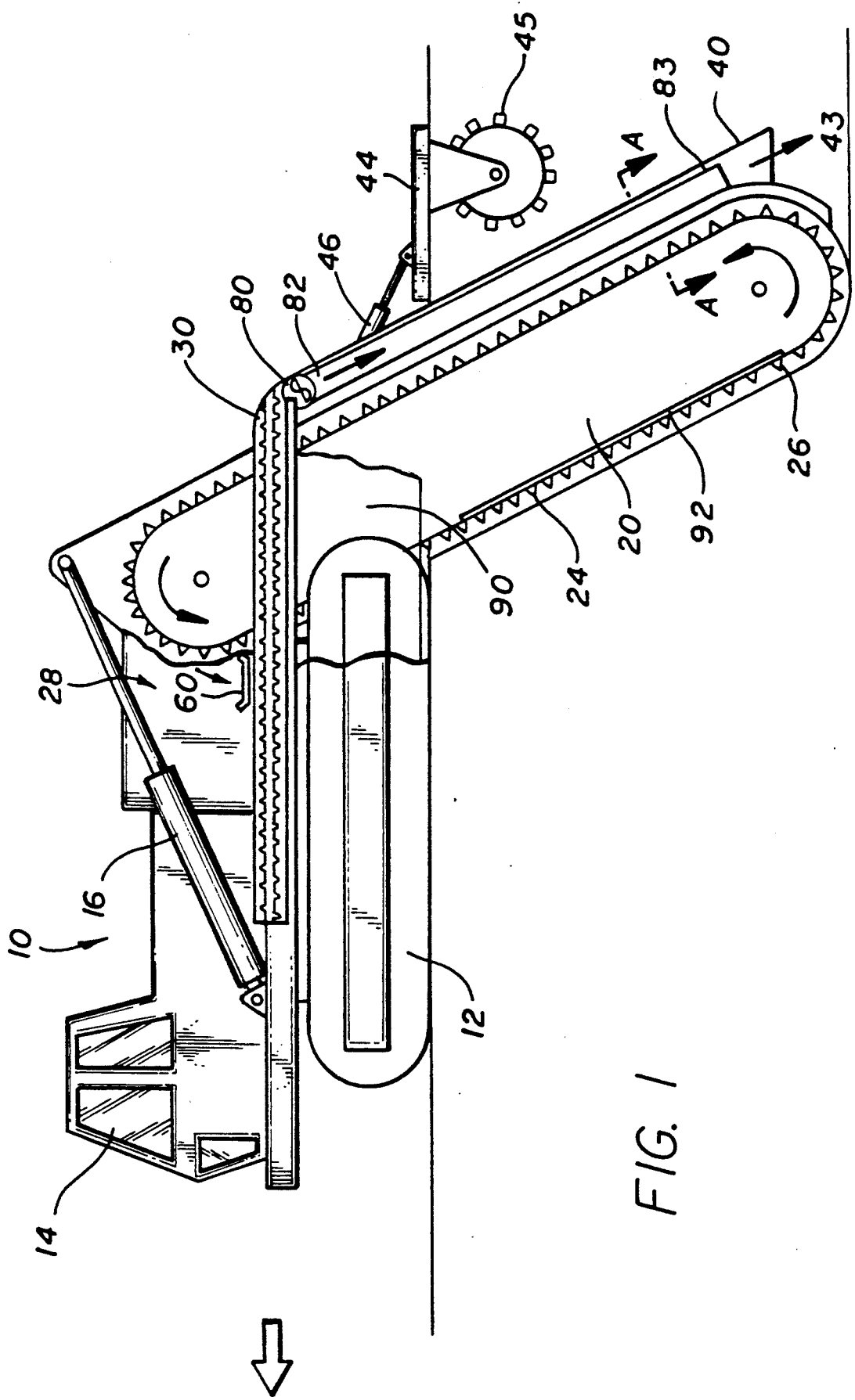
FIG. 1 is a schematic side elevation view of a mobile surface deep trench soil remediation apparatus according to the invention.
Figure 3:
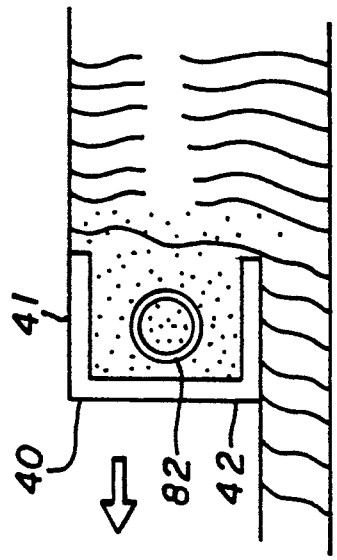
FIG. 3 is a cross section taken at line A—A on FIG. 1.

As seen in FIG. 1, a surface soil remediation apparatus comprises a conventional trenching machine 10 which travels to the left as shown by the arrow and which is provided with elongated crawler tracks or treads 12 or, in the alternative, a wheeled drive can be used if desired. The operator's cabin 14 includes the usual controls for the trenching machine which includes a boom 20 which can be raised or lowered to its desired digging depth by a hydraulic ram 16. As used herein, the term "boom" is intended to encompass raisable and lowerable digging apparatus accessories of various forms including elongated booms of various lengths and widths as well as circular or oval shaped digging apparatus. Persons skilled in the art will appreciate that wider digging apparatus may be used for relatively shallow trenching whereas deeper trenching ordinarily necessitates the use of narrower booms and correspondingly narrower trenches. The deep trench digging boom 20 of the trenching machine has a single or a pair of endless drive chains 24 (only one of which is shown) mounted on opposite sides thereof as is conventional and a series of milling teeth and buckets or soil elevators 26 is mounted between the drive chains to continuously lift and remove excavated soil from the trench. Also mounted on the trenching machine 10 is a process conveyer 30 which receives soil to be processed or treated and which is arranged for immediately returning and replacing soil in the trench behind the trenching machine 10. For this purpose a backfill shield 40 having a generally U-shaped cross section best seen in FIG. 3, is mounted in close proximity to the trailing end of the boom 20. Backfill shield 40 has a pair of sidewalls 41 attached to a main shield wall 42 and has its discharge opening 43 located proximate the lower surface of the excavated trench. A tow shield 44 is pivotally mounted on the tractor so that the shield 44 can be pressed downwardly by a hydraulic ram 46 into firm engagement with the ground surface above the trench which is being refilled. Optionally, a compaction wheel 45 with compaction feet of selected configuration may also be mounted as shown in FIG. 1.

Figure 2:
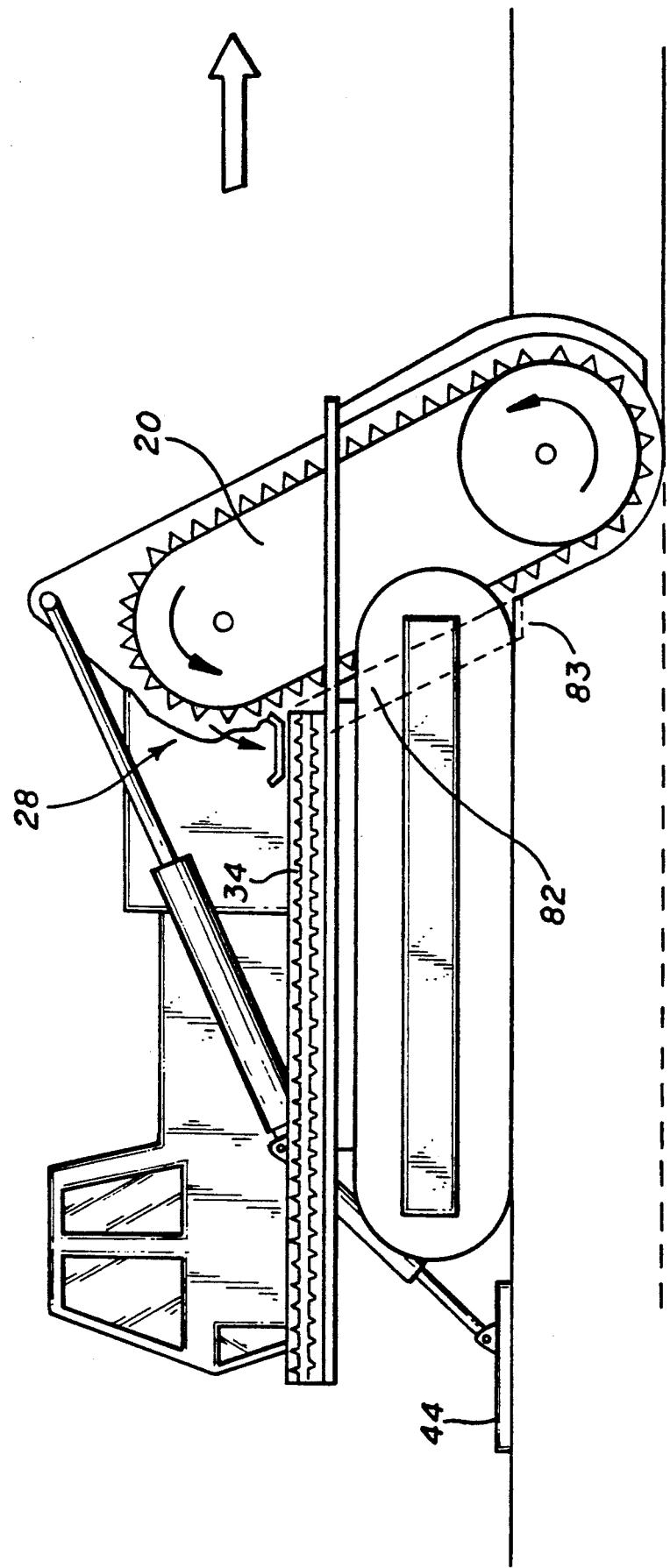
FIG. 2 is a schematic side elevation view of a mobile surface shallow trench soil remediation apparatus according to the invention.

A modified embodiment of the apparatus for shallow trenching is shown in FIG. 2 wherein like reference numerals refer to like parts. The embodiment of FIG. 2 is intended to travel to the right as shown by the arrow and is intended primarily for shallow contamination such as results from oil spills and the like. Since a deep trenching operation is not required, this embodiment does not require a backfill shield as does the FIG. 1 embodiment. It can therefore travel to the right as seen in FIG. 2 whereby the operator can view the digging boom and see the path of the excavation simultaneously. It should be noted that travel of the apparatus in a direction such that the boom leads the crawler tracks or wheels has the dual advantage that the crawler tracks or support wheels are used to assist in compacting the re-filled trench and that they move over treated rather than contaminated soil and are therefore less likely to become fouled when working in gummy soil contaminated by oil spills and the like.

Figure 4:
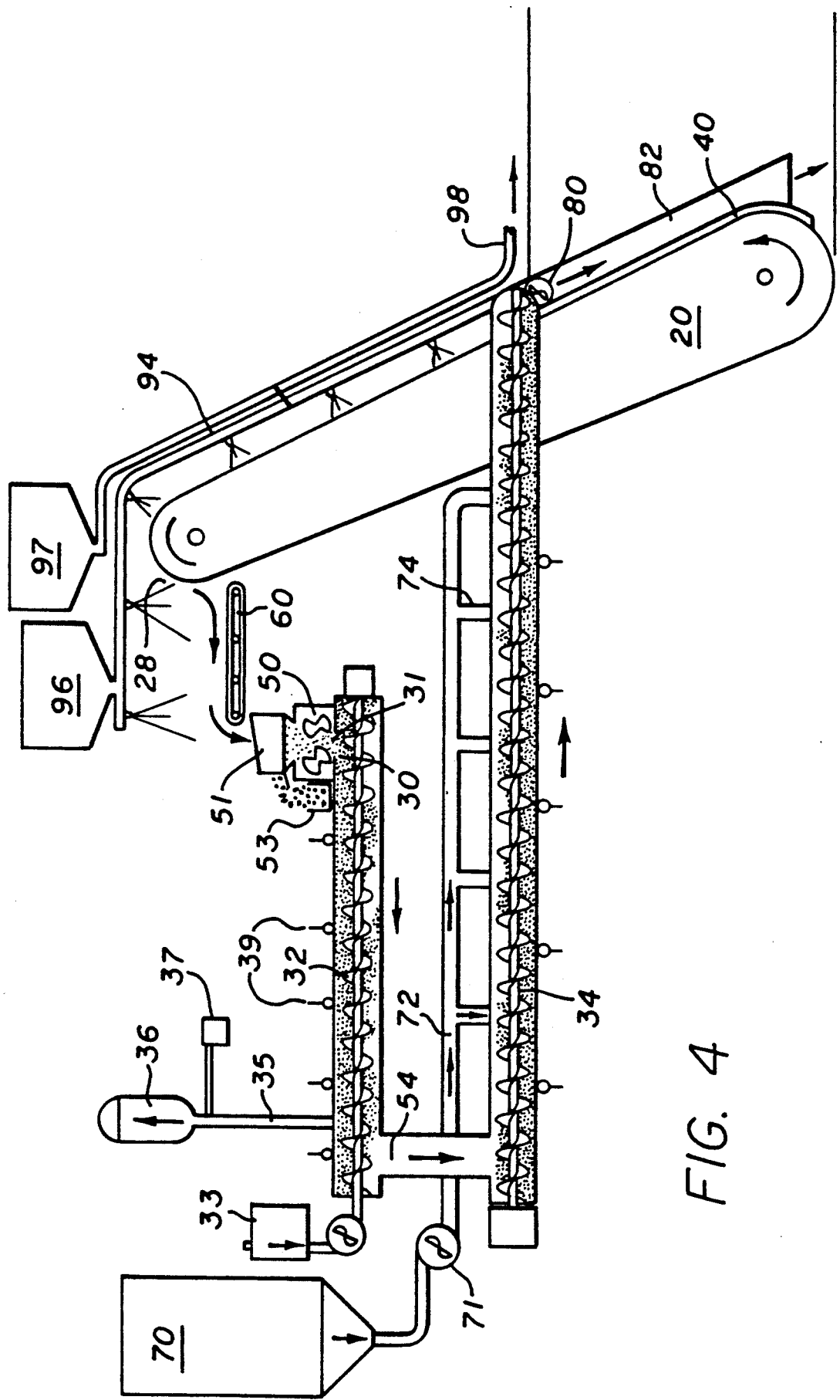
FIG. 4 is a schematic side elevation of the apparatus of FIG. 1 showing the flow of contaminated soil and the sequential processing thereof.

Turning now to FIG. 4 where the flow and sequential processing of the contaminated soil is shown schematically, a soil and rock crusher 50 may also be mounted on the apparatus to receive excavated soil from the trenching boom 20. If significant proportions of rock are encountered, a vibratory screen table 51 may be used to separate large rocks to hopper 53 before the soil is discharged into the crusher 50. A transfer conveyor 60 comprising an endless belt apparatus may be arranged to guide the uncrushed soil from the discharge end 28 of the boom 20 to the inlet opening of the crusher 50. As seen in FIG. 4, the transfer conveyor 60 is located slightly lower than the elevation of the soil discharge end 28 of the boom 20.

The crusher 50 is mounted at the inlet end 31 of the process conveyor 30 which is seen in FIG. 4 to comprise a first heated section 32 and second treatment section 34 located downstream of the heated section. The conveyor is shown schematically as a screw or auger conveyor although it will be appreciated that other types of conveying apparatus for moving the soil through the process train can be used. Convection heat applied to the soil by a screw conveyor is preferred to other methods of heating soil, e.g., such as by adding steam, since convection heat does not introduce water vapor or any additional gases so that only those volatile contaminants which are initially present in the soil need to be decontaminated before discharge to atmosphere.

Since excavated and crushed soil from waste sites can be expected to contain a significant amount of volatilizable hydrocarbons and the like, means are provided in the form of a heat generator 33 for heating the heated conveyor section 32 to liberate volatile contaminants therefrom. Volatilized contaminants and vapors are removed from the heated conveyor section 32 through a gas outlet conduit 35 where the gases are scrubbed in a scrubber 36 before discharge to the atmosphere. A contaminant residue tank 37 collects harmful contaminants removed by the scrubber in known fashion. Contaminant analyzer probes 39 may conveniently be arranged at spaced locations along the various sections of the process conveyor 30 to monitor the volatilization of volatile contaminants and treatment of remaining solids.

Downstream of the heated section, the process conveyor includes the treatment section 34 in which wet and dry reagents are transmitted from supplies 70 via pump 71 and a plurality of feedlines (shown schematically as a single feedline) 72 to various inlets 74 in the process conveyor 30 where the selected reagents are intimately mixed with the soil to be returned to the trench. These selected reagents stabilize, neutralize, destroy or render soluble inorganic compounds present in the soil into non-soluble compounds. Such reagents may also be of an organophilic type which encapsulate the organic compounds, then degrade in situ. The use of organophilic reagents is ordinarily considered a substitute for, rather than a step used in conjunction with, heating of organics to volatilize and remove them as vapors and gases. The preferred arrangement includes the heat generator 33 (which may be fueled in part by the exhaust of the tractor) for heating the screw in a section of the process conveyor although this may not be essential in all instances. Contaminated soil mixed with wet or dry reagents is discharged from the treatment section 34 of process conveyor 30 to the inlet of a high pressure discharge pump 80 which then pumps the slurried or pasty composition through a discharge chute 82, which is considered part of the process conveyor, chute 82 having a discharge end 83 mounted between the sidewalls 41 and rearwardly of the main wall 42 of the backfill shield 40. Alternatively, the process conveyor 30 may have a discharge section (not shown) and discharge end located at 83 near the bottom of the backfill shield 40 instead of using a chute 82. Such a discharge section would necessarily have to be hingedly connected to the treatment section 34 and the separate pump 80 could be eliminated.

In the shallow trench modified apparatus of FIG. 2, the discharge chute 82 is mounted on the left side of the digging boom, i.e., the opposite side 20 from that shown in FIG. 1. Since the trailing end of the FIG. 1 embodiment of the trenching machine has upwardly moving elevators 26 filled with contaminated soil which cannot be allowed to come into contact with the processed soil exiting the discharge pump 80, the backfill shield 40 performs this function. The backfill shield is unnecessary in FIG. 2. The treated soil mixed with reagents is extruded into the bottom of the trench as the apparatus moves forwardly. Selected soil hardening reagents can be mixed with the soil to form a hardenable slurry whereby the replaced treated soil prevents collapse of the trench and acts as a seal preventing the migration of contaminants from the untreated contaminated soil to the treated de-contaminated soil.

The tow shield 44 of FIG. 1 prevents the treated soil from extruding above the site surface when the soil is being pumped into the backfill shield 40 (FIG. 1) and pressure extruded into the trench. Thus, the tow shield 44 acts as a pressure lid on the pressurized soil during pumping. The tow shield 44 can also be affixed with a vibrator means (not shown) for deep consolidation or compaction of the replaced, treated soil if such soil is not in a pasty form, and thereby also operates as a vibrating leveler to maintain a level working and treatment surface.

The apparatus also preferably includes a hood or shroud 90 mounted to enclose and contain the trenching operation as to prevent or minimize the escape of harmful contaminants into the atmosphere. The details of the shroud arrangement will be apparent to persons skilled in the art. The interior of the shroud will typically be maintained under subatmospheric or vacuum pressure conditions by a vacuum pump (not shown) which prevents release of harmful contaminants to atmosphere.

Since toxic waste sites are known to contain a variety of potentially harmful material such as rigid barrels and other metal wastes which can damage the trenching apparatus, a metal detector 92 (FIG. 1) with a knife-like design is preferably mounted in advance of the digging path of the trenching apparatus to sound an alarm to the operator in the event that potentially damaging buried metal objects are located in the pathway of the digging boom.

For added flexibility in treating varied soil conditions, a spray bar 94 (FIGS. 4 and 5) may be mounted in close proximity to the trenching machine elevators 26 for spraying raw excavated contaminated soil with suitable reagents from a source 96 thereof. These reagents which may be heated or at ambient temperature and may, if desired, also be positioned to wet the contaminated soil as it passes over the transfer conveyor 60. This may be particularly desirable when operating in a highly consolidated or compacted soil which must be serrated during the digging process by cutter teeth. This operation ordinarily produces fine airborne particles thus necessitating a spray reagent application to prevent these fine airborne particles from migrating into the atmosphere. Additionally, application of reagents under high pressure jetting from spray bar 94 assists in removing clinging soil from the soil elevators 26. Soil capping reagents from a source 97 thereof may also be applied to the surface of the backfilled trench by a conduit and discharge nozzle 98.

Figure 5:
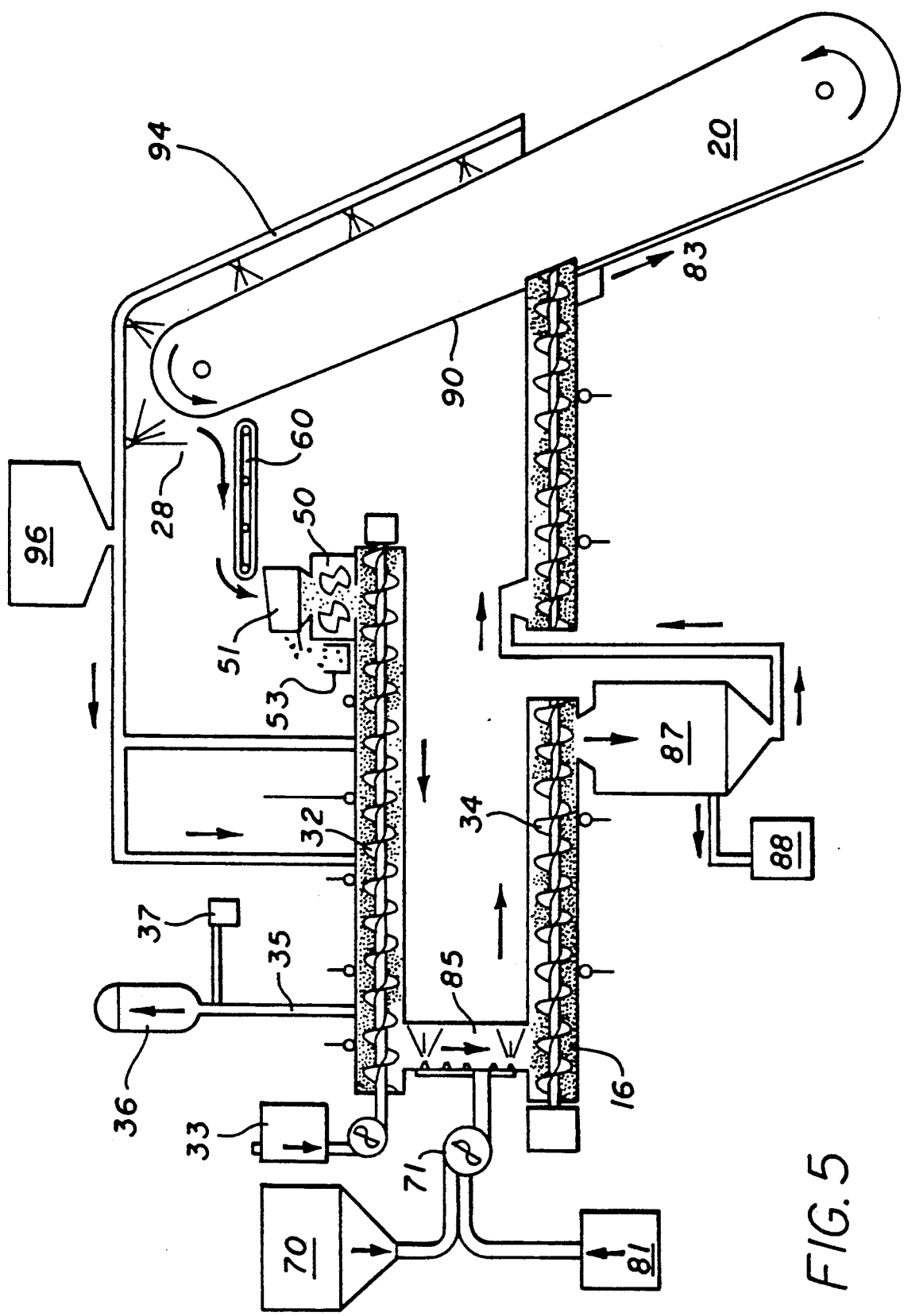
FIG. 5 is a schematic side elevation like FIG. 4, showing a modified flow of contaminated soil and the removal of contaminants therefrom.

FIG. 5 shows a modified schematic view of the apparatus process train which is particularly useful for treatment of oil contaminated sand or soil in which the oil must be removed from the sand and not returned to the trench. A supply source 81 of surfactant chemical is introduced via pump 71 and high pressure jets into a sonic or high pressure mixing chamber 85 interposed between the heated conveyor section 32 and the treatment conveyor section 34. Ideally, surfactant is introduced into oil-contaminated sand or soil at pressures as high as 10,000 psi to effectively separate oil or other recoverables such as precious metals from the soil. Oil or other recoverables is removed from the soil in separator 87 and is collected in storage container 88. Cleansed soil is then returned to the treatment conveyor section 34 for discharge into the previously excavated trench.

Figure 6:
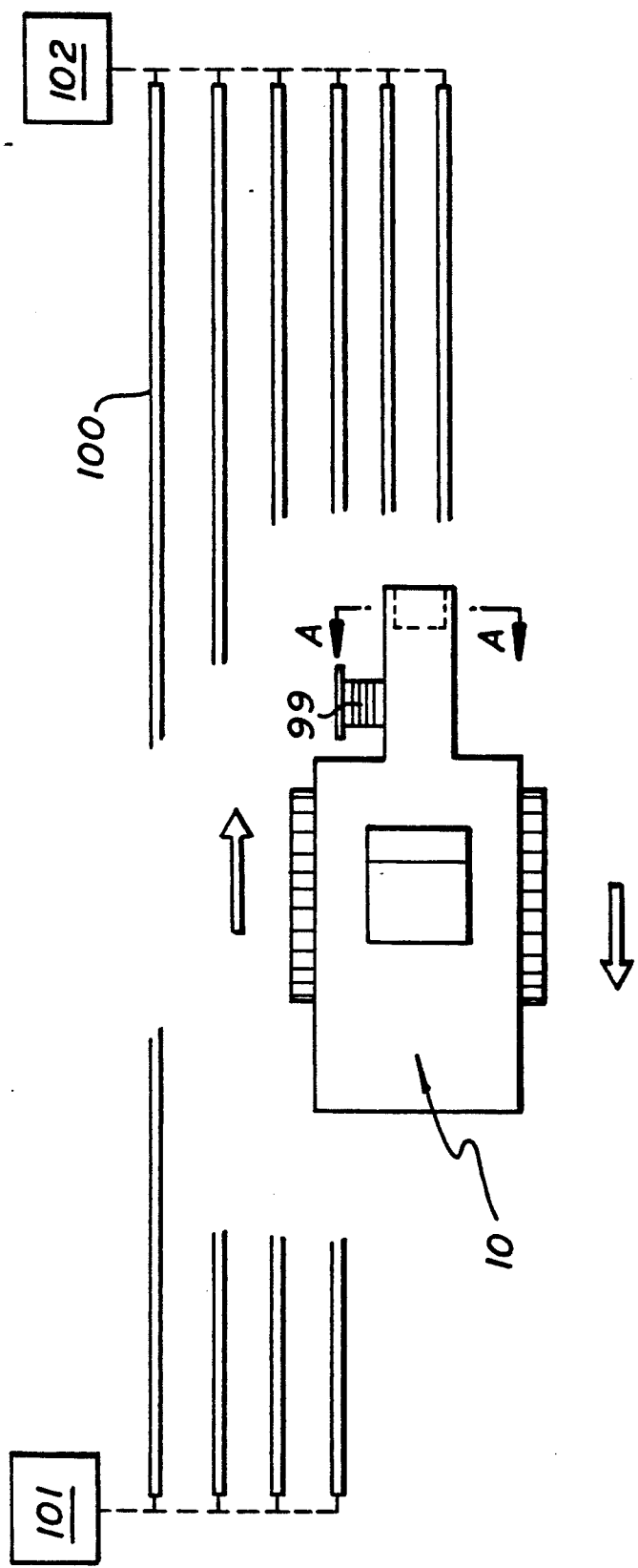
FIG. 6 is a plan view of a contaminated waste site in which a grid of treatment and monitoring pipes has been placed by the apparatus.

Finally, with reference to FIG. 6, a reel apparatus 99 for placing flexible conduit to form a grid 100 of in situ contaminant treatment and monitoring pipes or conduits is shown mounted on trenching machine 10. The flexible conduits are discharged from a spool immediately into the trench at selected elevations whereby conduit can be placed simultaneously with the trenching process and covered during the same operation. The grid 100 may be configured in various patterns such as parallel conduits, crisscross parallel conduits placed at different elevations or perimeter conduit placement, etc. Due to the multitude of different conditions which may be encountered in treating solid waste disposal sites, post trenching treatment by a treatment grid may be required. As will be appreciated by those skilled in the art, a grid system may deliver a wide variety of biochemical nutrients or chemical treatment reagents from sources 101, 102 with the capabilities of changing the pH, neutralizing hydrogen sulfides, and neutralizing, breaking or rendering less harmful specific carbon and chlorine rings. Organophilic reagents may also be used to treat organic compositions in situ. When bioremediation methods are selected, select microbes and nutrients can be added to the soil via the grid arrangement.

Persons skilled in the art will readily appreciate that various modifications can be made from the preferred embodiment thus the scope of protection is intended to be defined only by the limitations of the appended claims.

We claim:

1. A surface soil processing apparatus comprising a mobile trenching machine, said trenching machine having a digging boom which is movable relative to the trenching machine, said digging boom extending from one end thereof and having a leading portion and a trailing portion and moveable soil elevators for removing soil from a trench; a process conveyor on said apparatus for receiving excavated soil and for conveying said soil through a processing station; means on said apparatus for processing said excavated soil at said process station; and said process conveyor having a discharge end arranged at said one end of the trenching machine and movable with said digging boom during adjustment thereof for extruding processed soil from said process conveyor to refill said trench adjacent to and behind said digging boom.

2. The apparatus of claim 1, further comprising a backfill shield having a generally U-shaped cross section and the base of said U-shaped cross section is mounted adjacent to the trailing portion of said digging boom.

3. The apparatus of claim 2, wherein said process conveyor discharges processed soil rearwardly of said digging boom and forwardly of said backfill shield.

4. The apparatus of claim 2, wherein said process conveyor further comprises a pump and a discharge chute having a soil discharge end positioned proximate the elevation at which treated soil is to be discharged into said trench.

5. The apparatus of claim 4, wherein said backfill shield is arranged between said digging boom and said discharge chute.

6. The apparatus of claim 1, further comprising a tow shield on said trenching machine in proximity to the trailing portion of said digging boom for acting as a pressure lid on top of said trench during extrusion of said processed soil into said trench.

7. The apparatus of claim 1, further comprising a vacuum shroud shielding said trenching machine for preventing the escape of gases liberated during trenching to atmosphere.

8. The apparatus of claim 1, further comprising a separator mounted on said trenching machine for separating objects above a predetermined size from excavated soil before said excavated soil is introduced into said process conveyor.

9. The apparatus of claim 1, further comprising a soil crusher mounted on said trenching machine at an elevation lower than an upper soil discharge end of said boom for receiving excavated soil from said elevators.

10. The apparatus of claim 9, wherein said process conveyor includes a transfer conveyor arranged to convey excavated soil from said discharge end of said boom to said inlet opening of said crusher.

11. The apparatus of claim 1, wherein said process station has a heated section having an enclosing housing, means for heating excavated soil in said heated section to liberate volatile contaminant vapors and gases therefrom; an outlet conduit extending from the interior of said housing for conveying heated gas and vapor therefrom, and a gas scrubber for cleaning said gas and vapor in said conduit before discharge thereof to atmosphere.

12. The apparatus of claim 11, wherein said process station has a treatment section arranged downstream from said heated section, and means for mixing said treatment reagents with said excavated soil arranged to add said reagents to said soil in said treatment section.

13. The apparatus of claim 12, wherein said process conveyor includes screw conveyors in said heated and said treatment sections.

14. The apparatus of claim 1, further comprising means for adding surfactant to contaminated soil and for removing hydrocarbon from said soil before said refilling of said trench with said treated soil.

15. The apparatus of claim 14, wherein said means for adding surfactant includes means for sonic turbulization of mixed surfactant and contaminated soil.

16. The apparatus of claim 1, further comprising means for adding liquid reagents to soil conveyed on said soil elevators during upward conveyance thereof.

17. The apparatus of claim 1, further comprising means on said apparatus for placement of a site treatment piping grid during excavation and backfilling of a trench dug by said digging boom.

* * * * *